United States Patent
Ishii et al.

(10) Patent No.: US 12,263,451 B2
(45) Date of Patent: Apr. 1, 2025

(54) HYDROPHILIC POROUS MEMBRANE AND METHOD FOR PRODUCING HYDROPHILIC POROUS MEMBRANE

(71) Applicant: FUJIFILM Corporation, Tokyo (JP)

(72) Inventors: Akihiro Ishii, Minami-ashigara (JP); Tetsuro Mitsui, Minami-ashigara (JP); Takeshi Umehara, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 1001 days.

(21) Appl. No.: 17/117,251

(22) Filed: Dec. 10, 2020

(65) Prior Publication Data

US 2021/0086139 A1    Mar. 25, 2021

Related U.S. Application Data

(63) Continuation of application No. PCT/JP2019/023623, filed on Jun. 14, 2019.

(30) Foreign Application Priority Data

Jun. 15, 2018  (JP) .................................. 2018-114754

(51) Int. Cl.
| | | |
|---|---|---|
| B01D 67/00 | (2006.01) | |
| B01D 69/02 | (2006.01) | |
| B01D 69/06 | (2006.01) | |
| B01D 71/22 | (2006.01) | |
| B01D 71/44 | (2006.01) | |
| B01D 71/68 | (2006.01) | |

(52) U.S. Cl.
CPC ......... *B01D 67/0088* (2013.01); *B01D 69/02* (2013.01); *B01D 69/06* (2013.01); *B01D 71/22* (2013.01); *B01D 71/441* (2022.08); *B01D 71/68* (2013.01); *B01D 2323/02* (2013.01); *B01D 2325/023* (2013.01); *B01D 2325/04* (2013.01); *B01D 2325/36* (2013.01)

(58) Field of Classification Search
CPC .. B01D 67/0088; B01D 71/441; B01D 71/22; B01D 71/68; B01D 69/02; B01D 69/06; B01D 2323/02; B01D 2325/023; B01D 2325/04; B01D 2325/36
See application file for complete search history.

(56) References Cited

U.S. PATENT DOCUMENTS

| | | | |
|---|---|---|---|
| 4,413,074 A | 11/1983 | Wrasidlo et al. | |
| 4,794,002 A | 12/1988 | Henis et al. | |
| 5,834,107 A | 11/1998 | Wang et al. | |
| 2007/0084788 A1 | 4/2007 | Moya et al. | |
| 2011/0165308 A1 | 7/2011 | Shiki | |
| 2015/0328591 A1 | 11/2015 | Morita et al. | |

FOREIGN PATENT DOCUMENTS

| | | | |
|---|---|---|---|
| CN | 101690870 A | 4/2010 | |
| CN | 102164656 A | 8/2011 | |
| CN | 104955554 A | 9/2015 | |
| EP | 946354 B1 * | 3/2006 | ............. B01D 39/16 |
| JP | 9-75694 A | 3/1997 | |
| JP | 2000-505719 A | 5/2000 | |
| JP | 2003-251152 A | 9/2003 | |
| JP | 2003-320230 A | 11/2003 | |
| JP | 2006081410 A * | 3/2006 | |
| JP | 2006-116383 A | 5/2006 | |
| JP | 2014-147853 A | 8/2014 | |
| JP | 2015-157278 A | 9/2015 | |

OTHER PUBLICATIONS

Machine translation of JP 2006081410A.*
Machine translation of JP H0975694.*
Machine translation of JP 2006116383.*
Office Action dated Jul. 27, 2022 from The State Intellectual Property Office of People's Republic of China in CN Application No. 201980039713.X.
Office Action dated Jan. 5, 2022 from the Japanese Patent Office in Japanese Application No. 2020-525677.
Office Action dated Jan. 29, 2022, issued by the State Intellectual Property Office of the P.R.C. in Chinese application No. 201980039713.X.
International Search Report dated Sep. 10, 2019 from the International Searching Authority in International Application No. PCT/JP2019/023623.
Written Opinion dated Sep. 10, 2019 from the International Bureau in International Application No. PCT/JP2019/023623.
International Preliminary Report on Patentability dated Nov. 11, 2020 from the International Bureau in International Application No. PCT/JP2019/023623.

* cited by examiner

*Primary Examiner* — Benjamin L Lebron
(74) *Attorney, Agent, or Firm* — Sughrue Mion, PLLC

(57) ABSTRACT

Provided is a hydrophilic porous membrane including a porous membrane and a hydroxyalkyl cellulose (preferably, hydroxypropyl cellulose) retained in the porous membrane, the hydroxyalkyl cellulose having a weight-average molecular weight of 10,000 or more and less than 110,000. The hydrophilic porous membrane of embodiments of the invention has high water permeability and can pass an integrity test in the case of being used as a filtration membrane of a filter cartridge. Also provided is a method for producing the above-mentioned hydrophilic porous membrane, the method comprising causing a hydrophilizing liquid including 0.005% to 0.500% by mass of a hydroxyalkyl cellulose having a weight-average molecular weight of 10,000 or more and less than 110,000, to permeate a porous membrane.

17 Claims, No Drawings

HYDROPHILIC POROUS MEMBRANE AND METHOD FOR PRODUCING HYDROPHILIC POROUS MEMBRANE

CROSS-REFERENCE TO RELATED APPLICATIONS

This application is a continuation of PCT International Application No. PCT/JP2019/023623 filed on Jun. 14, 2019, which claims priority under 35 U.S.C § 119 (a) to Japanese Patent Application No. 2018-114754 filed on Jun. 15, 2018, the entire content of which is incorporated herein by reference.

BACKGROUND OF THE INVENTION

1. Field of the Invention

The present invention relates to a hydrophilic porous membrane and a method for producing a hydrophilic porous membrane.

2. Description of the Related Art

Porous membranes made of polymers are industrially useful as filtration membranes for water purification applications and the like, and products produced by pleating a porous membrane and storing the resultant in a cartridge having a certain capacity are also commercially available. Usually, filter cartridges are subjected to an integrity test in order to check the presence or absence of defects such as pinholes and defective sealing. In the integrity test, water is passed through a filtration membrane installed in a filter to fill the nanopores with water, subsequently pressure is applied thereto, and gas leakage is observed. At this time, in a case in which the filtration membrane is not wetted with water and there are nanopores that are not filled up with water, when pressure is applied, gas leaks even if there is no pinhole, and integrity cannot be determined. That is, in a case in which the filtration membrane is hydrophobic, it is difficult to accurately check the presence or absence of defects by the integrity test. Particularly, in a filter cartridge, both ends of a cylindrically rolled filtration membrane are fusion-welded to plates called end plates; however, complete wetting of the vicinity of the fusion-welded parts is not easily achieved, and even if there is no defect, the filter cartridge is likely to be considered as a failure in the integrity test.

In JP2003-320230A, it is disclosed that a hydrophilic polymer is applied in advance as a wetting agent only on both end portions of the porous membrane, which serve as the fusion-welding regions, and thereby the wettability of the fusion-welding regions at the time of being assembled into a cartridge is secured.

Furthermore, in JP2003-251152A, a microfiltration porous membrane which is obtained by adding a hydrophilic polymer to a polyether sulfone membrane, and endures autoclave sterilization treatment, is disclosed. In the production of the microfiltration porous membrane described in JP2003-251152A, a hydroxypropyl cellulose having a molecular weight of 110,000 to 150,000 is used as a hydrophilic polymer.

SUMMARY OF THE INVENTION

An object of the present invention is to provide a hydrophilic porous membrane in which the hydrophilicity of the porous membrane as a base material has been enhanced, and a method for producing the hydrophilic porous membrane. In particular, an object of the invention is to provide a hydrophilic porous membrane which can pass an integrity test at the time of being used as a filtration membrane of a filter cartridge, the hydrophilic porous membrane having high water permeability, and to provide a method for producing the hydrophilic porous membrane.

The inventors of the present invention have conducted thorough investigations in order to solve the above-described problems, and found that a hydrophilic porous membrane produced using a specific hydrophilic polymer gives accurate results in an integrity test and also has high water permeability. Thus, the above-described problems have been solved.

That is, the present invention provides the following <1> to <14>.

<1> A hydrophilic porous membrane comprising a porous membrane and a hydroxyalkyl cellulose retained in the porous membrane, in which the hydroxyalkyl cellulose has a weight-average molecular weight of 10,000 or more and less than 110,000.

<2> The hydrophilic porous membrane according to <1>, in which the porous membrane has a pore size distribution in a thickness direction, and the pore size distribution has a structure which is asymmetric in the thickness direction.

<3> The hydrophilic porous membrane according to <1> or <2>, in which the hydroxyalkyl cellulose has a weight-average molecular weight of 10,000 or more and 100,000 or less.

<4> The hydrophilic porous membrane according to any one of <1> to <3>, in which a content of the hydroxyalkyl cellulose is 0.05% to 3% by mass with respect to a mass of the hydrophilic porous membrane.

<5> The hydrophilic porous membrane according to any one of <1> to <3>, in which a content of the hydroxyalkyl cellulose is 0.1% by mass or more and less than 0.5% by mass with respect to the mass of the hydrophilic porous membrane.

<6> The hydrophilic porous membrane according to any one of <1> to <5>, in which the hydroxyalkyl cellulose is a hydroxypropyl cellulose.

<7> The hydrophilic porous membrane according to any one of <1> to <6>, in which the porous membrane contains polysulfone.

<8> The hydrophilic porous membrane according to <7>, in which the porous membrane retains polyvinylpyrrolidone.

<9> The hydrophilic porous membrane according to any one of <1> to <8>, in which the hydrophilic porous membrane retains the hydroxyalkyl cellulose on an entire surface of the porous membrane.

<10> The hydrophilic porous membrane according to any one of <1> to <8>, in which the porous membrane has a long sheet form and retains the hydroxyalkyl cellulose only at both long side end portions.

<11> A method for producing the hydrophilic porous membrane according to any one of <1> to <9>, the method comprising causing a hydrophilizing liquid including 0.005% to 0.500% by mass of the hydroxyalkyl cellulose to permeate the porous membrane.

<12> The method according to <11>, in which the permeation is carried out by immersing the entire porous membrane in the hydrophilizing liquid.

<13> The method according to <12>, in which the immersion is carried out for 30 seconds or less.

<14> The method for producing the hydrophilic porous membrane according to <10>, the method comprising coating both the long side end portions with a hydrophilizing liquid including 0.005% to 0.500% by mass of the hydroxyalkyl cellulose.

According to embodiments of the invention, there are provided a hydrophilic porous membrane in which the hydrophilicity of a porous membrane as a base material has been enhanced, and a method for producing the hydrophilic porous membrane. The hydrophilic porous membrane of embodiments of the invention can pass an integrity test for a filter cartridge and also has high water permeability.

DESCRIPTION OF THE PREFERRED EMBODIMENTS

Hereinafter, the present invention will be described in detail.

In the present specification, the term "to" is used to mean that the numerical values described before and after the term are included as the lower limit value and the upper limit value.

<Hydrophilic Porous Membrane>

In the present specification, the hydrophilic porous membrane means a membrane in which a porous membrane serving as a base material is hydrophilized. A hydrophilic porous membrane refers to a membrane in which hydrophilicity has been increased with respect to a porous membrane as a base material, by retaining a hydroxyalkyl cellulose therein, and it is not intended to mean that the porous membrane as a base material is completely hydrophobic.

The hydrophilic porous membrane is a membrane having a plurality of nanopores. The pores can be checked with, for example, a scanning electron microscope (SEM) image or a transmission electron microscope (TEM) image of a membrane cross-section.

The hydrophilic porous membrane of embodiments of the invention includes a porous membrane and a hydroxyalkyl cellulose retained in the porous membrane.

In a case in which it is said that a material is retained in the porous membrane, it is meant that the material is bonded to the porous membrane to the extent that the material is not easily peeled off during storage or use of the hydrophilic porous membrane. The porous membrane and the hydroxyalkyl cellulose may be bonded to each other by, for example, hydrophobic interaction.

The hydroxyalkyl cellulose may be retained in a state of coating at least a portion of the outer surface of the porous membrane. In the present specification, the outer surface of the porous membrane means the membrane surface of the porous membrane (front surface or back surface of the membrane) and the surface of the porous membrane that is in contact with the various nanopores inside the porous membrane (may be referred to as "surface of nanopores" in the present specification). In the porous membrane, either one of the membrane surfaces may be coated, or both membrane surfaces may be coated. In the hydrophilic porous membrane of the embodiments of the present invention, in a case in which the nanopores that are coated inside constitute a portion of a plurality of nanopores inside the porous membrane, the portion may be, for example, in the vicinity of either one of the membrane surfaces of the porous membrane. The membrane surface at that time is preferably a coated membrane surface. It is most preferable that the membrane surfaces (both the front surface and the back surface of the membrane) of the porous membrane and the entire surface of the nanopores are coated.

The hydrophilic porous membrane of embodiments of the present invention may retain the hydroxyalkyl cellulose on the entire surface or may retain the hydroxyalkyl cellulose only in a portion. By retaining the hydroxyalkyl cellulose on the entire surface, hydrophilization of the entire porous membrane can be preferably achieved. Furthermore, by achieving hydrophilization only in a portion where hydrophilicity is particularly required, it is possible to achieve hydrophilization to a necessary extent while highly utilizing the characteristics of the porous membrane as the base material.

As a preferable example in which the hydrophilic porous membrane of embodiments of the invention retains the hydroxyalkyl cellulose only in a portion, a hydrophilic porous membrane retaining the hydroxyalkyl cellulose only at both long side end portions of a porous membrane in the form of a long sheet may be mentioned. For example, in the case of a porous membrane having a short side that measures 20 to 35 cm, the both the long side end portions may be regions located within 4 cm, and more preferably within 2 cm, in the short side direction from the edge of the long side of the hydrophilic porous membrane. In a case in which the porous membrane is used as a filtration membrane of a filter cartridge, a load is likely to be applied at both end portions. That is, the porous membrane in the form of a long sheet is pleated as necessary and is rolled into a cylindrical shape, the seam is sealed, and then both end portions of the cylinder are fusion-welded to plates called end plates of the cartridge. At the time of fusion-welding, as heat is applied, the porous membrane is hydrophobized, and gas leakage is likely to occur in the integrity test. Particularly, by having the hydrophilicity of the both end portions, to which heat is applied, increased by retaining the hydroxyalkyl cellulose, a hydrophilic porous membrane that can prevent the decrease in the hydrophilicity originating from a cartridge production process is obtained, and by utilizing this hydrophilic porous membrane, a filter cartridges that can pass an integrity test can be produced.

Therefore, it is preferable that the porous membrane in the form of a long sheet, particularly the porous membrane in the form of a long sheet used as a filtration membrane of a filter cartridge, retains the hydroxyalkyl cellulose at least at both the long side end portions.

With regard to the hydrophilic porous membrane of embodiments of the invention, in the regions retaining the hydroxyalkyl cellulose, the hydroxyalkyl cellulose may be retained approximately uniformly in the entirety of the membrane thickness direction or may be retained in a portion of the membrane thickness direction; however, it is preferable that the hydroxyalkyl cellulose is retained approximately uniformly in the membrane thickness direction.

[Porous Membrane]

(Structure of Porous Membrane)

According to the present specification, the porous membrane is a membrane that serves as a base material of the hydrophilic porous membrane.

The porous membrane refers to a membrane having a plurality of nanopores. The nanopores can be checked with, for example, a scanning electron microscope (SEM) image or a transmission electron microscope (TEM) image of a membrane cross-section.

The pore size of the nanopores in the porous membrane can be appropriately selected depending on the size of the object to be filtered; however, the pore size may be 0.01 μm to 25 μm, and more preferably 0.03 μm to 20 μm. In a case in which the porous membrane has a pore size distribution, the pores may be distributed in this range. The pore size may be measured from an image of a membrane cross-section obtained using an electron microscope. The porous membrane is cut with a microtome or the like, and an image of a cross-section of the porous membrane can be obtained as a thin-film slice with which the cross-section can be observed.

The pore size of the nanopores of the hydrophilic porous membrane may become smaller than the pore size of the porous membrane as the base material by retaining the hydroxyalkyl cellulose; however, usually, the pore size of the hydrophilic porous membrane can be approximated to be the same as the pore size of the porous membrane.

The porous membrane may have a structure having a pore size distribution in the thickness direction or may have a homogeneous structure having no pore size distribution in the thickness direction; however, it is preferable that the porous membrane has a structure having a pore size distribution in the thickness direction. Furthermore, with regard to the structure having a pore size distribution in the thickness direction, it is preferable that the structure is a structure which is asymmetric in the thickness direction (asymmetric structure), the structure having a pore size distribution such that the pore size of the front surface and the pore size of the back surface of the membrane are different. The same applies to the hydrophilic porous membrane. Examples of the asymmetric structure include a structure in which the pore size continuously increases in the thickness direction from one membrane surface toward the other membrane surface, and a structure which has a layered dense region having the minimum pore size in the inside, and in which the pore size continuously increases in the thickness direction from this dense region toward at least one membrane surface of the porous membrane.

Particularly, it is preferable that the porous membrane has a structure which has a layered dense region having the minimum pore size in the inside, and in which the pore size continuously increases in the thickness direction from the dense region toward at least one membrane surface of the porous membrane.

According to the present specification, in a case in which a comparison of the pore sizes in the membrane thickness direction is made, the comparison is carried out by dividing a SEM image of a membrane cross-section in the membrane thickness direction. The number of divisions can be selected as appropriate according to the thickness of the membrane. The number of divisions is set to at least 5 or more, and for example, for a membrane having a thickness of 200 μm, a comparison is carried out by making 20 divisions starting from surface X, which will be described later. Meanwhile, the size of the division width means the size of the width in the thickness direction of the membrane, and does not mean the width size in the image. In the comparison of the pore sizes in the thickness direction of the membrane, the pore sizes are compared as the average pore sizes of various sections. The average pore size of each section may be, for example, an average value of 50 pores in each section of a membrane cross-sectional view. The membrane cross-sectional view in this case may be obtained, for example, at a width of 80 μm (distance of 80 μm in a direction parallel to the surface). At this time, for a section in which the pores are large and 50 pores cannot be measured, it is acceptable to measure only the number of pores that can be taken in that section. At this time, in a case in which a pore is so large that it does not fit in the section, the size of the pore is measured over other sections.

The layered dense region having the minimum pore size refers to a layered region of the porous membrane corresponding to a section having the smallest average pore size among the sections of the above-mentioned membrane cross-section. The dense region may comprise a region corresponding to one section or may comprise two, three or more regions corresponding to a plurality of sections having an average pore size that is 1.1 or less times the average pore size of the section having the smallest average pore size. The thickness of the dense region may be 0.5 μm to 50 μm, and preferably 0.5 μm to 30 μm. In the present specification, the average pore size of the dense region is defined as the minimum pore size of the porous membrane. The minimum pore size of the porous membrane is preferably 0.01 μm or more, and more preferably 0.02 μm or more, and the minimum pore size is preferably 10 μm or less, and more preferably 5 μm or less. Here, the average pore size of the dense region is defined as the average pore size measured by ASTM F316-80.

It is preferable that the porous membrane has a dense region in the inside. The term inside means not being in contact with the surface of the membrane, and the phrase "has a dense region in the inside" means that the dense region is not a section that is closest to any surface of the membrane. Depending on the case of using a porous membrane having a structure having a dense region in the inside, the permeability of a substance intended to permeate is not likely to be lowered as compared to the case of using a porous membrane having the same dense region that is in contact with the surface. While it is not wished to be bound by any theory, it is speculated to be because, as the dense region is in the inside, adsorption of the above-described substances or other substances is not likely to occur.

It is preferable that the dense region is biased toward any one surface side with respect to the central region of the thickness of the porous membrane. Specifically, it is preferable that the dense region is located within a distance of ⅖, more preferably within a distance of ⅓, and even more preferably within a distance of ¼, of the thickness of the porous membrane from any one surface of the porous membrane. This distance may be determined in the above-mentioned membrane cross-section image. According to the present specification, the surface of the porous membrane on the side closer to the dense region is referred to as "surface X".

In the porous membrane, it is preferable that the pore size continuously increases in the thickness direction from the dense region toward at least either one surface. In the porous membrane, the pore size may continuously increase in the thickness direction from the dense region toward the surface X, the pore size may continuously increase in the thickness direction from the dense region toward the surface on the opposite side of the surface X, or the pore size may continuously increase from the dense region toward both surfaces of the porous membrane in the thickness direction. Among these, it is preferable that the pore size continuously increases in the thickness direction at least from the dense region toward the surface on the opposite side of the surface X, and it is more preferable that the pore size continuously increases from the dense region toward both surfaces of the porous membrane in the thickness direction. The phrase "pore size continuously increases in the thickness direction" implies that the difference in the average pore size between adjoining sections in the thickness direction is 50% or less, preferably 40% or less, and more preferably 30% or less, of the difference between the maximum average pore size (maximum pore size) and the minimum average pore size (minimum pore size). The term "continuous increases" essentially means that there is no decrease and that an increase occurs uniformly; however, a region where there is a decrease may occur accidentally. For example, on the occasion of combining two sections in each group from the surface, in a case in which the average value of the combination is uniformly increasing (uniformly decreasing in the case of going from the surface toward the dense region), it can be considered that the "pore size continuously increases in the thickness direction from the dense region toward the surface of the membrane".

The maximum pore size of the porous membrane is preferably 0.1 µm or more, and more preferably 1.5 µm or more, and is preferably 25 µm or less, more preferably 23 µm or less, and 21 µm or less. According to the present specification, the average pore size of the section having the largest average pore size among the sections of the above-mentioned membrane cross-section is designated as maximum pore size of the porous membrane.

The ratio of the average pore size of the dense part and the maximum pore size of the porous membrane (ratio of the minimum pore size and the maximum pore size of the porous membrane, the ratio being a value obtained by dividing the maximum pore size by the minimum pore size; in the present specification, also referred to as "anisotropy ratio") is preferably 3 or more, more preferably 4 or more, and even more preferably 5 or more. This is because the average pore size of regions other than the dense region is increased, and the substance permeability of the porous membrane is increased. The anisotropy ratio is preferably 25 or less, and more preferably 20 or less. It is because the effect such as the above-described multi-stage filtration is efficiently obtained with an anisotropic ratio in the range of 25 or less.

The section having the largest average pore size is preferably a section that is closest to any surface of the membrane, or a section that is in contact with that section.

In the section closest to any surface of the membrane, the average pore size is preferably more than 0.05 µm and 25 µm or less, more preferably more than 0.08 µm and 23 µm or less, and even more preferably more than 0.1 µm and 21 µm or less. Furthermore, the ratio of the average pore size of the section closest to any one surface of the membrane to the average pore size of the dense region is preferably from 1.2 to 20, more preferably from 1.5 to 15, and even more preferably from 2 to 13.

The thickness of the porous membrane is not particularly limited; however, from the viewpoints of the membrane strength, handleability, and filtration performance, the thickness is preferably 10 µm to 1,000 µm, more preferably 10 µm to 500 µm, and even more preferably 30 µm to 300 µm.

The thickness of the hydrophilic porous membrane may be larger than the thickness of the porous membrane as the base material, by retaining the hydroxyalkyl cellulose; however, the thickness of the hydrophilic porous membrane is usually almost the same as the thickness of the porous membrane.

(Composition of Porous Membrane)

The porous membrane includes a polymer. It is preferable that the porous membrane is essentially formed of a polymer. The polymer preferably has a number-average molecular weight (Mn) of 1,000 to 10,000,000, and more preferably 5,000 to 1,000,000.

Examples of the polymer include thermoplastic or thermosetting polymers. Specific examples of the polymer include polysulfone, sulfonated polysulfone, polyether sulfone (PES), sulfonated polyether sulfone, cellulose acylate, nitrocellulose, polyacrylonitrile, a styrene-acrylonitrile copolymer, a styrene-butadiene copolymer, a saponification product of an ethylene-vinyl acetate copolymer, polyvinyl alcohol, polycarbonate, an organosiloxane-polycarbonate copolymer, polyester carbonate, an organopolysiloxane, polyphenylene oxide, polyamide, polyimide, polyamideimide, polybenzimidazole, an ethylene-vinyl alcohol copolymer, polytetrafluoroethylene (PTFE), polyethylene, polypropylene, polyfluoroethylene, polyethylene terephthalate, polyamide, polyimide, 6,6-nylon, and polyvinylidene fluoride (PVDF). These may be homopolymers, copolymers, polymer blends, or polymer alloys, from the viewpoints of solubility, optical properties, electrical properties, strength, elasticity, and the like.

Among these, polysulfone, polyether sulfone, PVDF, sulfonated polysulfone, sulfonated polyether sulfone, 6,6-nylon, and cellulose acylate are preferred, and polysulfone is more preferred.

The porous membrane may include components other than the polymer, as additives.

Examples of the additives include metal salts of inorganic acids, such as sodium chloride, lithium chloride, sodium nitrate, potassium nitrate, sodium sulfate, and zinc chloride; metal salts of organic acids, such as sodium acetate and sodium formate; polymers such as polyethylene glycol, and polyvinyl pyrrolidone; polymer electrolytes such as sodium polystyrene sulfonate and polyvinylbenzyl trimethyl ammonium chloride; and ionic surfactants such as sodium dioctyl sulfosuccinate and sodium alkylmethyl taurate. The additives may act as swelling agents for the porous structure.

For example, in a case in which polysulfone or polyether sulfone is used as the polymer, it is preferable that the porous membrane further includes polyvinylpyrrolidone. At this time, the polyvinylpyrrolidone may be in a state of being retained in the porous membrane. Polysulfone or polyether sulfone, both of which are hydrophobic, acquires increased hydrophilicity by including polyvinylpyrrolidone. Polyvinylpyrrolidone is, for example, added as a pore-forming agent to a stock solution for film-forming of a polysulfone membrane or a polyether sulfone membrane, as described in JP1989-034403A (JP-S64-034403A). Most of the polyvinylpyrrolidone in the stock solution for film-forming is dissolved in coagulating water and removed during the film-forming process; however, a portion thereof remains on the membrane surface.

It is preferable that the porous membrane is a membrane formed from one composition as a single layer, and it is preferable that the porous membrane is not a laminated structure of a plurality of layers.

With regard to the method for producing the porous membrane, reference can be made to JP1992-349927A (JP-H04-349927A), JP1992-068966B (JP-H04-068966B), JP1992-351645A (JP-H04-351645A), JP2010-235808A, and the like.

A commercially available product may be used as the porous membrane. Examples include SUMILITE FS-1300 (manufactured by Sumitomo Bakelite Co., Ltd.), MICRO PES 1FPH (manufactured by Membrana GmbH), PSEUH20 (polysulfone membrane, manufactured by FUJIFILM Corporation), Durapore (PVDF membrane, manufactured by Merck Millipore, Ltd.), and 15406 (PES membrane, manufactured by Sartorius AG).

[Hydroxyalkyl Cellulose]

The hydroxyalkyl cellulose in the hydrophilic porous membrane of embodiments the invention is a hydrophilic polymer that makes the porous membrane hydrophilic.

Hydrophobicity of the cellulose skeleton of the hydroxyalkyl cellulose contributes to the hydrophobic interaction with the porous membrane, which is a base material, and retains the hydroxyalkyl cellulose in the porous membrane, and at the same time, hydrophilicity can be imparted to the porous membrane by means of a hydroxy group or a hydroxypropyl group in a side chain of the hydroxyalkyl cellulose. In addition, since the hydroxyalkyl cellulose has a high intermolecular force, it is presumed that the molecules can strongly interact with each other in the hydrophilic porous membrane and retain the form of the hydrophilic porous membrane.

Furthermore, since a hydroxyalkyl cellulose is a component that can be used as a food additive, it is not necessary to wash away the hydroxyalkyl cellulose after filter cartridge production. Therefore, a safe hydrophilic porous membrane with low process load can be obtained.

The weight-average molecular weight of the hydroxyalkyl cellulose may be 10,000 or more and less than 110,000, preferably 10,000 or more and 100,000 or less, more preferably 10,000 or more and less than 100,000, even more preferably 10,000 or more and 80,000 or less, and most preferably 30,000 or more and 50,000 or less. The weight-average molecular weight according to the present specification means a molecular weight measured by gel permeation chromatography (GPC), and specifically, the weight-average molecular weight may be measured by the procedure and conditions described in the Examples of this specification.

By adjusting the weight-average molecular weight of the hydroxyalkyl cellulose to be less than 110,000, it becomes difficult for the hydroxyalkyl cellulose to aggregate. Therefore, clogging caused by the hydroxyalkyl cellulose is less likely to occur, and deterioration of the water permeability of the hydrophilic porous membrane can be prevented. Furthermore, by adjusting the weight-average molecular weight to 10,000 or more, the interaction between the hydroxyalkyl cellulose molecules and the interaction between the hydroxyalkyl cellulose and the porous membrane can be made sufficient for the hydroxyalkyl cellulose to be retained in the porous membrane.

Regarding the hydroxyalkyl cellulose, a hydroxyalkyl cellulose obtained by adding an alkylene oxide having 3 to 5 carbon atoms to cellulose is preferred. This is because the interaction between the porous membrane and the hydroxyalkyl cellulose and the hydrophilicity of the resulting hydrophilic porous membrane can be obtained to a practically preferable extent. Hydroxypropyl cellulose obtained by adding propylene oxide (having 3 carbon atoms) to cellulose is most preferred. In a case in which the number of addition (degree of substitution) of the alkylene oxide is large, hydrophilicity increases, and in a case in which the number of addition is small, hydrophilicity decreases. From this point of view, the degree of molar substitution is preferably 1 or more, and more preferably 2 or more.

The content of the hydroxyalkyl cellulose in a region where the hydroxyalkyl cellulose is retained (region where the hydroxyalkyl cellulose has been caused to permeate) is preferably 0.05% to 3% by mass, more preferably 0.1% to 1.0% by mass, even more preferably 0.1% or more and less than 0.5% by mass, and particularly preferably 0.2% by mass or more and less than 0.5% by mass, with respect to the mass of the hydrophilic porous membrane.

[Method for Producing Hydrophilic Porous Membrane]

The hydrophilic porous membrane can be produced by subjecting the porous membrane, which is a base material, to a hydrophilization treatment using a hydroxyalkyl cellulose. Specifically, the hydrophilic porous membrane can be produced by causing a hydrophilizing liquid including a hydroxyalkyl cellulose to permeate the porous membrane. The porous membrane having the hydrophilizing coating formed thereon may be further subjected to a washing treatment, a sterilization treatment, and the like.

(Hydrophilizing Liquid)

The hydrophilizing liquid may be prepared as a solution including a hydroxyalkyl cellulose. The solvent is not particularly limited as long as it is water or a solvent having a property of being miscible with water. The solvent may be a mixed solvent of water and an organic solvent. In a case in which a mixed solvent of water and an organic solvent is used, the organic solvent is preferably at least one or more lower alcohols. Examples of the lower alcohol include alcohols having 5 or fewer carbon atoms, such as methanol, ethanol, propanol, isopropanol, butanol, ethylene glycol, propylene glycol, and glycerin. As the solvent, methanol, ethanol, or isopropanol is more preferred, and ethanol is even more preferred.

It is preferable that the hydrophilizing liquid includes 0.005% to 0.500% by mass, and more preferably 0.200% to 0.490% by mass, of the hydroxyalkyl cellulose. By adjusting the content to 0.005% by mass or more, hydrophilization of the porous membrane as the base material can be sufficiently carried out, and by adjusting the content to 0.500% by mass or less, deterioration of the water permeability caused by clogging of the porous membrane can be prevented.

The hydrophilizing liquid may also include a surfactant, a preservative, a film curing agent such as polyphenol, and the like in addition to the hydroxyalkyl cellulose and the solvent.

(Permeation)

The method of causing the hydrophilizing liquid to permeate the porous membrane is not particularly limited, and examples thereof include an immersion method, a coating method, a transfer method, and a spraying method.

In order to cause the hydrophilizing liquid to efficiently permeate the porous membrane to the inside, an immersion method and a coating method are preferred. It is preferable that the permeation is carried out such that the hydrophilizing liquid permeates the entire thickness direction of the porous membrane at least in the region that is subjected to hydrophilization.

In the immersion method, the porous membrane is impregnated with the hydrophilizing liquid by immersing the porous membrane in the hydrophilizing liquid. After the immersion, any excess hydrophilizing liquid may be removed by pulling up the porous membrane from the hydrophilizing liquid.

The immersion may be performed under pressure. By applying pressure, the hydrophilizing liquid can be efficiently injected into various nanopores of the porous membrane.

The immersion time or the press-fitting time in the case of carrying out an immersion treatment or a press-fitting treatment is not particularly limited; however, generally, the immersion time or the press-fitting time may be about 0.5 seconds to 1 minute, and preferably about 0.5 seconds to 30 seconds. Shortening of the immersion time can be promoted by selection of a solvent or the like.

The amount of attachment of the hydroxyalkyl cellulose can be appropriately regulated by means of the immersion time for the porous membrane in the hydrophilizing liquid and the concentration of the hydroxyalkyl cellulose in the hydrophilizing liquid.

In a case in which only a portion of the porous membrane is coated, a coating method of applying the hydrophilizing liquid only on the portion that is wished to be coated can be performed. It is preferable that the application is performed such that the hydrophilizing liquid permeates the entire thickness direction of the porous membrane. The application of the hydrophilizing liquid can be carried out by a method of bringing a sponge or cloth impregnated with the hydrophilizing liquid into contact with the surface of the porous membrane, or a known method such as bead coating, gravure coating, or wire bar coating.

(Drying and Heating)

After permeation of the hydrophilizing liquid into the porous membrane, it is preferable to volatilize and remove the solvent in the hydrophilizing liquid by drying. Examples of the drying means include heat drying, air drying, and reduced pressure drying, and there is no particular limitation; however, air drying or heat drying is preferred from the viewpoint of simplicity of the production process. Drying may be achieved by simply leaving the porous membrane to stand.

(Washing)

After the above-described drying, it is preferable to carry out washing with a washing solvent. This is because excess hydroxyalkyl cellulose and the like can be removed. Furthermore, unnecessary components included in the raw material porous membrane can also be removed by washing. The washing method is not particularly limited; however, a washing solvent may be caused to permeate the membrane surface and the nanopore surface of the hydrophilic porous membrane by an immersion or press-fitting method and then removed. Examples of the washing solvent can include the solvents exemplified as the solvent of the hydrophilizing liquid. Permeation and removal of the washing solvent may be performed two or more times. At this time, the washing solvents used in the washing of two or more times may be the same or different; however, it is preferable that the washing solvents are different. The washing solvent used at the end of washing is preferably water. It is particularly preferable that the porous membrane is immersed in water. This is because organic solvent components such as alcohol are eliminated.

The hydrophilic porous membrane after washing may be dried again by the above-described procedure.

(Sterilization Treatment)

As a sterilization treatment for the hydrophilic porous membrane, for example, a high-pressure steam sterilization treatment can be carried out. In particular, it is preferable that a treatment by means of steam at high temperature and high-pressure using an autoclave is carried out. Usually, a high-pressure steam sterilization treatment for plastics is carried out by pressurizing with saturated steam and treating for 10 to 30 minutes in an environment at about 110° C. to 140° C.; however, the sterilization treatment of the hydrophilic porous membrane of embodiments of the invention can also be carried out under similar conditions. Examples of the autoclave used for the sterilization treatment include SS325 manufactured by Tomy Seiko Co., Ltd.

<Use of Hydrophilic Porous Membrane>

The hydrophilic porous membrane of embodiments of the invention can be used for a filtration membrane in various use applications. The filtration membrane is applied to separation, purification, collection, concentration, and the like of liquids containing or suspending various macromolecules, microorganisms, yeasts, and fine particles, and can be applied particularly to a case in which from a liquid containing minute fine particles that need to be filtered, those fine particles need to be separated. For example, a filtration membrane can be used in the case of separating fine particles from various suspensions, fermentation liquids, culture liquids, and the like, as well as suspensions of pigments.

Specifically, the hydrophilic porous membrane of embodiments of the invention can be used as a microfiltration membrane that is required for the production of drugs in the pharmaceutical industry, the production of alcoholic beverages such as beer in the food industry, refined processing in the electronic industrial field, the production of purified water, and the like.

In a case in which the hydrophilic porous membrane of embodiments of the invention having a pore size distribution is used as a filtration membrane, fine particles can be efficiently captured by arranging a region having a smaller pore size to come closer to the exit side (outlet side) of the filtrate and performing filtration. Furthermore, since the hydrophilic porous membrane has a pore size distribution, the fine particles that have been introduced through the surface of the membrane are eliminated by adsorption or adhesion before reaching the minimum pore size portion. Therefore, clogging does not easily occur, and high filtration efficiency can be maintained over a long period of time.

The hydrophilic porous membrane of embodiments of the invention can be used for various applications after being processed into a shape according to the use application. Examples of the shape of the hydrophilic porous membrane include a flat membrane shape, a tubular shape, a hollow fiber shape, a pleated shape, a fibrous shape, a spherical particle shape, a crushed particle shape, and a lump-shaped continuous body shape. The hydrophilic porous membrane may be processed into a shape according to the use application before the hydrophilization treatment of the porous membrane, or may be processed into a shape according to the use application after the hydrophilization treatment of the porous membrane.

The hydrophilic porous membrane may be mounted in a cartridge that can be easily removed in devices that are used for various use applications. It is preferable that the hydrophilic porous membrane is retained in a form capable of functioning as a filtration membrane in the cartridge. A cartridge retaining the hydrophilic porous membrane can be produced in the same manner as in the case of a known porous membrane cartridge, and for example, reference can be made to WO2005/037413A and JP2012-045524A.

For example, the filter cartridge can be produced as follows.

A long hydrophilic porous membrane is pleated such that a crease is formed in the short side (width) direction. For example, the long hydrophilic porous membrane can be usually sandwiched between two sheets of membrane supports, and the assembly can be pleated by a known method. A nonwoven fabric, a woven fabric, a net, and the like may be used as the membrane support. The membrane support functions so as to reinforce the filtration membrane against fluctuations in the filtration pressure and also to introduce a liquid into the back of the fold. The width of the pleat folds may be, for example, 5 mm to 25 mm. The pleated hydrophilic porous membrane may be rolled into a cylindrical shape, and the seam thereof may be sealed.

The cylindrical-shaped hydrophilic porous membrane is end-sealed to end plates. The end-sealing may be performed by a known method according to the material of the end plates. At the time of using a thermosetting epoxy resin for the end plate, a liquid of a prepared epoxy resin adhesive is poured into a potting mold and preliminarily cured to increase the viscosity of the adhesive to an appropriate degree, one end surface of the cylindrical-shaped filter material is inserted into this epoxy adhesive, and then the epoxy adhesive may be completely cured by heating. In a case in which the material of the end plates is a thermoplastic resin such as polypropylene or polyester, a method of pouring a heat-melted resin into a mold and immediately thereafter, inserting one end surface of the cylindrical-shaped filter material into the resin, may be carried out. On the other hand, only the sealing surface of an already molded end plate is brought into contact with a hot plate or an infrared heater is radiated to melt only the plate surface, and one end surface of the cylindrical filter material may be pressed against the molten surface of the plate to be welded thereto.

The assembled filter cartridge may be further subjected to a known washing process.

In the filter cartridge, part or all of the hydroxyalkyl cellulose in the hydrophilic porous membrane may be dissolved in a solvent used in a washing process or the like and removed.

Examples

Features of the embodiments of the present invention will be described more specifically below by way of Examples and Comparative Examples. The materials, amounts of use, proportions, treatment contents, treatment procedures, and the like shown in the following Examples can be appropriately modified without departing from the purport of the present invention. Therefore, the scope of the present invention should not be limitedly interpreted by the following specific examples.

Production of Hydrophilic Porous Membranes of Examples and Comparative Examples

A hydrophilic polymer described in the table was stirred in water to completely dissolve the hydrophilic polymer, and a hydrophilizing liquid having the concentration described in the table was produced.

Regarding hydroxypropyl cellulose, a hydroxyalkyl cellulose manufactured by Nippon Soda Co., Ltd. (NISSO HPC grade M, grade H, grade SL, or grade SSL) was used.

Regarding hydroxyethyl cellulose, SANHEC-L of SAN-HEC manufactured by Sansho Co., Ltd. was used.

Regarding polyvinyl alcohol, a product manufactured by Sigma-Aldrich Co. LLC was used.

The hydrophilizing liquid was caused to permeate a porous membrane using an immersion method or a coating method. The immersion method was carried out by continuously immersing the porous membrane in an immersion tank for the time described in Table 1. The coating method was carried out by applying the coating liquid to the region described in Table 1 of the porous membrane using a die coating method.

In Table 1, PSE20 is a polysulfone membrane, PSE20, manufactured by FUJIFILM Corporation, and PSK45 is a polysulfone membrane, PSK45, manufactured by FUJIFILM Corporation. PSE20 has a minimum pore size of 0.2 μm and a thickness of 140 μm, and has a structure having an asymmetric pore size distribution. PSK45 has a minimum pore size of 0.45 μm and a thickness of 170 μm, and has a structure having an asymmetric pore size distribution. In addition, all of the porous membranes were used after being cut into a size of 25 cm×200 cm.

The porous membrane after permeation was dried in an oven at 80° C. for 80 seconds.

Subsequently, washing was performed to remove any excess hydrophilic polymer. The porous membrane was immersed for 30 minutes in a 30% aqueous solution of ethanol at normal temperature, in which ethanol and pure water were mixed at a weight ratio of 3:7. Subsequently, the porous membrane was immersed in pure water for 5 minutes in order to remove ethanol. Finally, the porous membrane was dried in an environment of a temperature of 70° C. and a humidity of 99% for 26 hours, and a hydrophilic porous membrane including the hydrophilic polymer, the amount of which is described in Table 1, was obtained.

Evaluation of Hydrophilic Porous Membranes of Examples and Comparative Examples

[Evaluation of Weight-Average Molecular Weight]

The weight-average molecular weight of the raw material hydrophilic polymer was obtained by performing gel permeation chromatography (GPC) measurement under the following analysis conditions and was evaluated.

Column: Shodex OHpak KB805HQ

Mobile phase: 0.1 M sodium acetate buffer solution

Flow rate: 1.0 mL/min

Temperature: 40° C.

Detector: RI (differential refractometer)

For the calculation of the molecular weight, standard pullulan samples, Shodex Pullulan P-5, P-10, P-20, P-50, P-82, P-100, P-200, P-400, P-800, and P-1600, were used.

[Integrity Test]

The hydrophilic porous membrane was sandwiched between two sheets of a polypropylene nonwoven fabric, the assembly was pleated at a fold width of 10 mm, folds corresponding to 138 ridges were taken and rolled into a cylindrical shape, and the seam was welded with an impulse sealer. Both ends of the cylinder were cut off by 5 mm on each side, and the cut surface was thermally welded to an end plate made of polypropylene, and thereby a filter cartridge having a membrane length of 30 inches was finished.

The filter cartridge thus obtained was mounted in a housing, and water was passed therethrough in a direction from the inside of the cylinder of the filter cartridge to the outside at a rate of 8 L/min for 200 seconds. Subsequently, the water in the housing was pulled out at atmospheric pressure by opening the leak valve in the upper part of the housing. Subsequently, an air pressure of 150 kPa was applied through the water inlet side, and the amount of air (air flow rate) coming after passing through the filtration filter cartridge was measured. Based on this measurement value, the integrity was evaluated according to the following criteria. The results are shown in Table 1.

A: 0 ml/min or more and 30 ml/min or less

B: More than 30 ml/min and 60 ml/min or less

C: More than 60 ml/min and 90 ml/min or less

D: More than 90 ml/min and 300 ml/min or less

E: More than 300 ml/min

[Water Permeability]

The water permeability was evaluated as water permeability obtained at the time of cutting out a porous membrane that had been subjected to a hydrophilization treatment, from the central area (an area at the central portion spanning 15 cm in the long side 200 cm in an area at the central portion spanning 10 cm in the short side 25 cm), into a circle having a diameter of 47 mm, and causing pure water to permeate the porous membrane while applying a pressure of 100 kPa. The volume of water that had flowed out through the membrane in 1 minute per unit area was measured, and this was designated as water permeability (ml/min/cm$^2$). At this time, the water permeability was evaluated by the following 5-grade criteria by taking the untreated porous membrane as a reference, based on the rate of decrease in water permeability caused by immersion in an hydroxyalkyl cellulose. The results are shown in Table 1.

A: 0% or more and less than 15%

B: 15% or more and less than 30%

C: 30% or more and less than 45%

D: 45% or more and less than 60%

E: 60% or more

TABLE 1

| | Porous membranes | Hydrophilic polymer | Amount of hydrophilic polymer in membrane (wt %) | Molecular weight | Hydrophilizing Liquid | | |
|---|---|---|---|---|---|---|---|
| | | | | | Hydrophilic polymer concentration (wt %) | Immersion time (other than coating method) | Immersion position |
| Example 1 | PSE20 | hydroxypropyl cellulose | 0.064% | 100,000 | 0.125 | Coating | 1.5 cm in Both end portions |
| Example 2 | PSE20 | hydroxypropyl cellulose | 0.015% | 100,000 | 0.03 | Coating | 1.5 cm in Both end portions |
| Example 3 | PSE20 | hydroxypropyl cellulose | 0.064% | 40,000 | 0.125 | Coating | 1.5 cm in Both end portions |
| Example 4 | PSE20 | hydroxypropyl cellulose | 0.015% | 40,000 | 0.03 | Coating | 1.5 cm in Both end portions |
| Example 101 | PSE20 | hydroxypropyl cellulose | 4.237% | 100,000 | 1.00 | 27 seconds | entire surface |
| Example 102 | PSE20 | hydroxypropyl cellulose | 2.119% | 100,000 | 0.500 | 27 seconds | entire surface |
| Example 5 | PSE20 | hydroxypropyl cellulose | 0.530% | 100,000 | 0.125 | 27 seconds | entire surface |
| Example 103 | PSE20 | hydroxypropyl cellulose | 0.510% | 100,000 | 0.122 | 27 seconds | entire surface |
| Example 104 | PSE20 | hydroxypropyl cellulose | 0.490% | 100,000 | 0.12 | 27 seconds | entire surface |
| Example 105 | PSE20 | hydroxypropyl cellulose | 0.340% | 100,000 | 0.11 | 27 seconds | entire surface |
| Example 106 | PSE20 | hydroxypropyl cellulose | 0.200% | 100,000 | 0.1 | 27 seconds | entire surface |
| Example 107 | PSE20 | hydroxypropyl cellulose | 0.127% | 100,000 | 0.06 | 27 seconds | entire surface |
| Example 108 | PSE20 | hydroxypropyl cellulose | 0.100% | 100,000 | 0.05 | 27 seconds | entire surface |
| Example 109 | PSE20 | hydroxypropyl cellulose | 0.021% | 100,000 | 0.005 | 27 seconds | entire surface |
| Example 110 | PSE20 | hydroxypropyl cellulose | 0.004% | 100,000 | 0.001 | 27 seconds | entire surface |
| Example 7 | PSE20 | hydroxypropyl cellulose | 0.530% | 40,000 | 0.125 | 27 seconds | entire surface |
| Example 111 | PSE20 | hydroxypropyl cellulose | 0.127% | 40,000 | 0.03 | 27 seconds | entire surface |
| Example 112 | PSE20 | hydroxyethyl cellulose | 0.530% | 100,000 | 0.125 | 27 seconds | entire surface |
| Example 12 | PSE20 | hydroxypropyl cellulose | 0.446% | 100,000 | 0.125 | Coating | 21 cm in Central portion not including 2 cm in end portion |
| Example 13 | PSE20 | hydroxypropyl cellulose | 0.107% | 100,000 | 0.03 | Coating | 21 cm in Central portion not including 2 cm in end portion |
| Example 113 | PSE20 | hydroxypropyl cellulose | 2.000% | 100,000 | 0.125 | 100 seconds | entire surface |
| Comparative Example 1 | PSE20 | hydroxypropyl cellulose | 0.530% | 700,000 | 0.125 | 27 seconds | entire surface |
| Comparative Example 2 | PSE20 | hydroxypropyl cellulose | 0.127% | 700,000 | 0.03 | 27 seconds | entire surface |
| Comparative Example 3 | PSE20 | hydroxypropyl cellulose | 0.530% | 1,000,000 | 0.125 | 27 seconds | entire surface |
| Comparative Example 4 | PSE20 | polyvinyl alcohol | 0.530% | 90,000 | 0.125 | 27 seconds | entire surface |
| Comparative Example 5 | PSE20 | — | — | — | — | — | No treatment |
| Example 18 | PSK45 | hydroxypropyl cellulose | 0.058% | 100,000 | 0.125 | Coating | 1.5 cm in Both end portions |
| Example 19 | PSK45 | hydroxypropyl cellulose | 0.014% | 100,000 | 0.03 | Coating | 1.5 cm in Both end portions |

TABLE 1-continued

| | | | | | | | |
|---|---|---|---|---|---|---|---|
| Example 114 | PSK45 | hydroxypropyl cellulose | 0.058% | 40,000 | 0.125 | Coating | 1.5 cm in Both end portions |
| Example 21 | PSK45 | hydroxypropyl cellulose | 0.014% | 40,000 | 0.03 | Coating | 1.5 cm in Both end portions |
| Example 115 | PSK45 | hydroxypropyl cellulose | 3.900% | 100,000 | 1.00 | 27 seconds | entire surface |
| Example 116 | PSK45 | hydroxypropyl cellulose | 1.950% | 100,000 | 0.500 | 27 seconds | entire surface |
| Example 117 | PSK45 | hydroxypropyl cellulose | 0.510% | 100,000 | 0.127 | 27 seconds | entire surface |
| Example 22 | PSK45 | hydroxypropyl cellulose | 0.488% | 100,000 | 0.125 | 27 seconds | entire surface |
| Example 118 | PSK45 | hydroxypropyl cellulose | 0.340% | 100,000 | 0.112 | 27 seconds | entire surface |
| Example 119 | PSK45 | hydroxypropyl cellulose | 0.200% | 100,000 | 0.1 | 27 seconds | entire surface |
| Example 120 | PSK45 | hydroxypropyl cellulose | 0.117% | 100,000 | 0.06 | 27 seconds | entire surface |
| Example 121 | PSK45 | hydroxypropyl cellulose | 0.100% | 100,000 | 0.050 | 27 seconds | entire surface |
| Example 122 | PSK45 | hydroxypropyl cellulose | 0.020% | 100,000 | 0.005 | 27 seconds | entire surface |
| Example 123 | PSK45 | hydroxypropyl cellulose | 0.004% | 100,000 | 0.001 | 27 seconds | entire surface |
| Example 124 | PSK45 | hydroxypropyl cellulose | 0.488% | 40,000 | 0.125 | 27 seconds | entire surface |
| Example 125 | PSK45 | hydroxypropyl cellulose | 0.117% | 40,000 | 0.030 | 27 seconds | entire surface |
| Example 126 | PSK45 | hydroxyethyl cellulose | 0.488% | 100,000 | 0.125 | 27 seconds | entire surface |
| Example 29 | PSK45 | hydroxypropyl cellulose | 0.411% | 100,000 | 0.125 | Coating | 21 cm in Central portion not including 2 cm in end portion |
| Example 30 | PSK45 | hydroxypropyl cellulose | 0.099% | 100,000 | 0.030 | Coating | 21 cm in Central portion not including 2 cm in end portion |
| Example 127 | PSK45 | hydroxypropyl cellulose | 0.495% | 100,000 | 0.125 | 100 seconds | entire surface |
| Comparative Example 6 | PSK45 | hydroxypropyl cellulose | 0.488% | 70,000 | 0.125 | 27 seconds | entire surface |
| Comparative Example 7 | PSK45 | hydroxypropyl cellulose | 0.488% | 1,000,000 | 0.125 | 27 seconds | entire surface |
| Comparative Example 101 | PSK45 | polyvinyl alcohol | 0.488% | 90,000 | 0.125 | 27 seconds | entire surface |
| Comparative Example 9 | PSK45 | — | — | — | — | — | No treatment |

| | Integrity test (ml/min) | Integrity evaluation | Water permeability (ml/min/cm$^2$) | Rate of decrease | Water permeability evaluation |
|---|---|---|---|---|---|
| Example 1 | 55 | B | 51 | 5.6% | A |
| Example 2 | 70 | C | 53 | 1.9% | A |
| Example 3 | 71 | C | 52 | 3.7% | A |
| Example 4 | 82 | C | 54 | 0.0% | A |
| Example 101 | 10 | A | 22 | 59.3% | D |
| Example 102 | 10 | A | 30 | 44.4% | C |
| Example 5 | 15 | A | 45 | 16.7% | B |
| Example 103 | 15 | A | 45 | 16.7% | B |
| Example 104 | 15 | A | 49 | 9.3% | A |
| Example 105 | 16 | A | 50 | 7.4% | A |
| Example 106 | 18 | A | 51 | 5.6% | A |
| Example 107 | 29 | A | 52 | 3.7% | A |
| Example 108 | 35 | B | 52 | 3.7% | A |
| Example 109 | 200 | D | 54 | 0.0% | A |
| Example 110 | 220 | D | 54 | 0.0% | A |
| Example 7 | 20 | A | 47 | 13.0% | B |
| Example 111 | 18 | A | 51 | 5.6% | A |
| Example 112 | 100 | D | 34 | 37.0% | C |
| Example 12 | 250 | D | 48 | 11.1% | A |
| Example 13 | 300 | D | 54 | 0.0% | A |
| Example 113 | 12 | A | 35 | 35.2% | C |

TABLE 1-continued

|  |  |  |  |  |  |
|---|---|---|---|---|---|
| Comparative Example 1 | 18 | A | 5 | 90.7% | E |
| Comparative Example 2 | 32 | B | 10 | 81.5% | E |
| Comparative Example 3 | 45 | B | 2 | 96.3% | E |
| Comparative Example 4 | 600 | E | 24 | 55.6% | E |
| Comparative Example 5 | >1500 | E | 54 | 0.0% | A |
| Example 18 | 51 | B | 165 | 1.2% | A |
| Example 19 | 65 | C | 164 | 1.8% | A |
| Example 114 | 56 | B | 161 | 3.6% | A |
| Example 21 | 74 | C | 165 | 1.2% | A |
| Example 115 | 10 | A | 68 | 59.3% | D |
| Example 116 | 7 | A | 85 | 49.1% | D |
| Example 117 | 11 | A | 141 | 15.6% | B |
| Example 22 | 12 | A | 163 | 2.4% | A |
| Example 118 | 22 | A | 164 | 1.8% | A |
| Example 119 | 28 | A | 165 | 1.2% | A |
| Example 120 | 25 | A | 166 | 0.6% | A |
| Example 121 | 38 | B | 166 | 0.6% | A |
| Example 122 | 190 | D | 166 | 0.6% | A |
| Example 123 | 250 | D | 167 | 0.0% | A |
| Example 124 | 15 | A | 152 | 9.0% | A |
| Example 125 | 24 | A | 161 | 3.6% | A |
| Example 126 | 101 | D | 115 | 31.1% | C |
| Example 29 | 200 | D | 165 | 1.2% | A |
| Example 30 | 280 | D | 157 | 6.0% | A |
| Example 127 | 12 | A | 150 | 10.2% | A |
| Comparative Example 6 | 15 | A | 10 | 94.0% | E |
| Comparative Example 7 | 36 | B | 7 | 95.8% | E |
| Comparative Example 101 | 550 | E | 60 | 64.1% | E |
| Comparative Example 9 | >1500 | E | 167 | 0.0% | A |

What is claimed is:

1. A hydrophilic porous membrane comprising a porous membrane and a hydroxypropyl cellulose retained in the porous membrane,
wherein the porous membrane contains polysulfone,
the porous membrane has a pore size distribution in a thickness direction, and the pore size distribution has a structure which is asymmetric in the thickness direction,
the hydroxypropyl cellulose has a weight-average molecular weight of 30,000 or more and less than 110,000,
a content of the hydroxypropyl cellulose is more than 0.1% by mass and less than 0.5% by mass with respect to a mass of the hydrophilic porous membrane, and
the hydrophilic porous membrane retains the hydroxypropyl cellulose on an entire surface of the porous membrane.

2. The hydrophilic porous membrane according to claim 1, wherein the hydroxypropyl cellulose has a weight-average molecular weight of 30,000 or more and 100,000 or less.

3. The hydrophilic porous membrane according to claim 1, wherein the hydroxypropyl cellulose has a weight-average molecular weight of 30,000 or more and 50,000 or less.

4. The hydrophilic porous membrane according to claim 1, wherein the porous membrane retains polyvinylpyrrolidone.

5. The hydrophilic porous membrane according to claim 1, having a structure which has a layered dense region having a minimum pore size in the inside, and in which the pore size continuously increases in the thickness direction from this dense region toward at least one membrane surface of the porous membrane.

6. The hydrophilic porous membrane according to claim 1, wherein minimum pore size of the porous membrane is 0.01 µm or more, and 10 µm or less.

7. The hydrophilic porous membrane according to claim 1, wherein minimum pore size of the porous membrane is 0.2 µm or more, and 0.45 µm or less.

8. The hydrophilic porous membrane according to claim 5, wherein minimum pore size of the porous membrane is 0.2 µm or more, and 0.45 µm or less.

9. The hydrophilic porous membrane according to claim 1, wherein the porous membrane has a long sheet form and retains the hydroxypropyl cellulose only at both long side end portions.

10. A method for producing the hydrophilic porous membrane according to claim 1, the method comprising
providing a porous membrane containing polysulfone, said membrane having a pore size distribution in a thickness direction, the pore size distribution having a structure which is asymmetric in the thickness direction,
providing a hydroxypropyl cellulose having a weight-average molecular weight of 30,000 or more and less than 110,000, and
causing a hydrophilizing liquid including 0.005% to 0.500% by mass of the hydroxypropyl cellulose to permeate the entire surface of the porous membrane, such that a content of the hydroxypropyl cellulose is more than 0.1% by mass and less than 0.5% by mass with respect to a mass of the hydrophilic porous membrane, and the porous membrane retains the hydroxypropyl cellulose on the entire surface of the porous membrane.

11. The production method according to claim 10, wherein the permeation is carried out by immersing the entire porous membrane in the hydrophilizing liquid.

12. The production method according to claim 11, wherein the immersion is carried out for 30 seconds or less.

13. The production method according to claim 10, wherein the porous membrane has a structure which has a layered dense region having the minimum pore size in the inside, and in which the pore size continuously increases in the thickness direction from this dense region toward at least one membrane surface of the porous membrane.

14. The production method according to claim 10, wherein minimum pore size of the porous membrane is 0.01 μm or more, and 10 μm or less.

15. The method for producing the hydrophilic porous membrane according to claim 12, the method comprising
    coating both the long side end portions with a hydrophilizing liquid including 0.005% to 0.500% by mass of the hydroxypropyl cellulose.

16. The production method according to claim 15, wherein the porous membrane has a structure which has a layered dense region having the minimum pore size in the inside, and in which the pore size continuously increases in the thickness direction from this dense region toward at least one membrane surface of the porous membrane.

17. The production method according to claim 15, wherein minimum pore size of the porous membrane is 0.01 μm or more, and 10 μm or less.

\* \* \* \* \*